United States Patent [19]
Stegman et al.

[11] Patent Number: 5,924,928
[45] Date of Patent: Jul. 20, 1999

[54] ENGAGEMENT NOISE ISOLATOR FOR AN AUTOMATIC TRANSMISSION

[75] Inventors: Jeffrey A. Stegman, New Palestine, Ind.; Harold Bruce Davidson, Livonia, Mich.; James Warren Young, Northville, Mich.; Timothy Raphael Allen, Livonia, Mich.

[73] Assignee: Ford Motor Company, Dearborn, Mich.

[21] Appl. No.: 08/874,810

[22] Filed: Jun. 13, 1997

[51] Int. Cl.⁶ .................................................. F16D 3/16
[52] U.S. Cl. ................................................ 464/73; 464/76
[58] Field of Search ........................... 464/73, 74, 76, 464/87, 160

[56] References Cited

U.S. PATENT DOCUMENTS

| | | | |
|---|---|---|---|
| 2,004,077 | 6/1935 | McCartney et al. | 464/76 |
| 2,514,897 | 7/1950 | Paulsen | 464/74 |
| 2,902,842 | 9/1959 | Byrom | 464/73 |
| 3,438,221 | 4/1969 | Paulsen | 464/76 |
| 3,731,500 | 5/1973 | Schlums | 464/74 |
| 3,922,958 | 12/1975 | Bate . | |
| 3,992,089 | 11/1976 | Hirose et al. . | |
| 4,417,482 | 11/1983 | Witt . | |
| 4,501,633 | 2/1985 | Zodrow et al. . | |
| 4,660,825 | 4/1987 | Umezawa . | |
| 4,700,582 | 10/1987 | Bessette . | |
| 5,033,323 | 7/1991 | Janson | 464/180 |
| 5,372,548 | 12/1994 | Wohlfeld | 464/76 |
| 5,545,089 | 8/1996 | Kirschey | 464/160 |

*Primary Examiner*—Eileen Dunn Lillis
*Attorney, Agent, or Firm*—Frank G. McKenzie

[57] ABSTRACT

An assembly including mutually engaged spline teeth includes a rubber isolator, retained in position between an external splined surface, and an internal splined surface is supported against movement and is adapted to contact the lateral face of an adjacent spline tooth so that the isolator is compressed due to rotation of one of the components relative to the other over a range of movement. Then the metal surfaces of the teeth on the first and second components are in mutually contact. In one form, the isolator is retained by an interference fit on a post located within an intervening space between teeth.

10 Claims, 2 Drawing Sheets

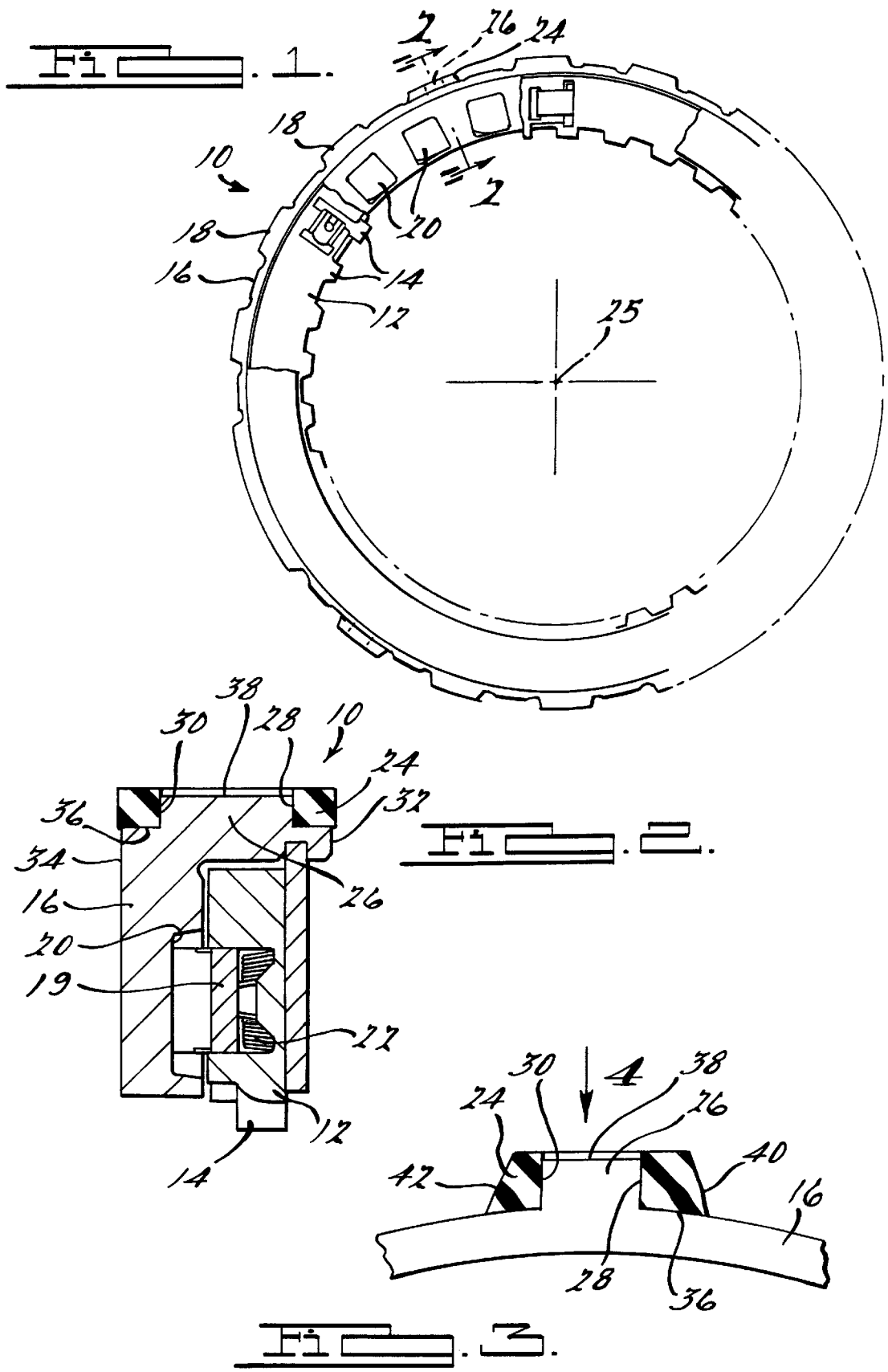

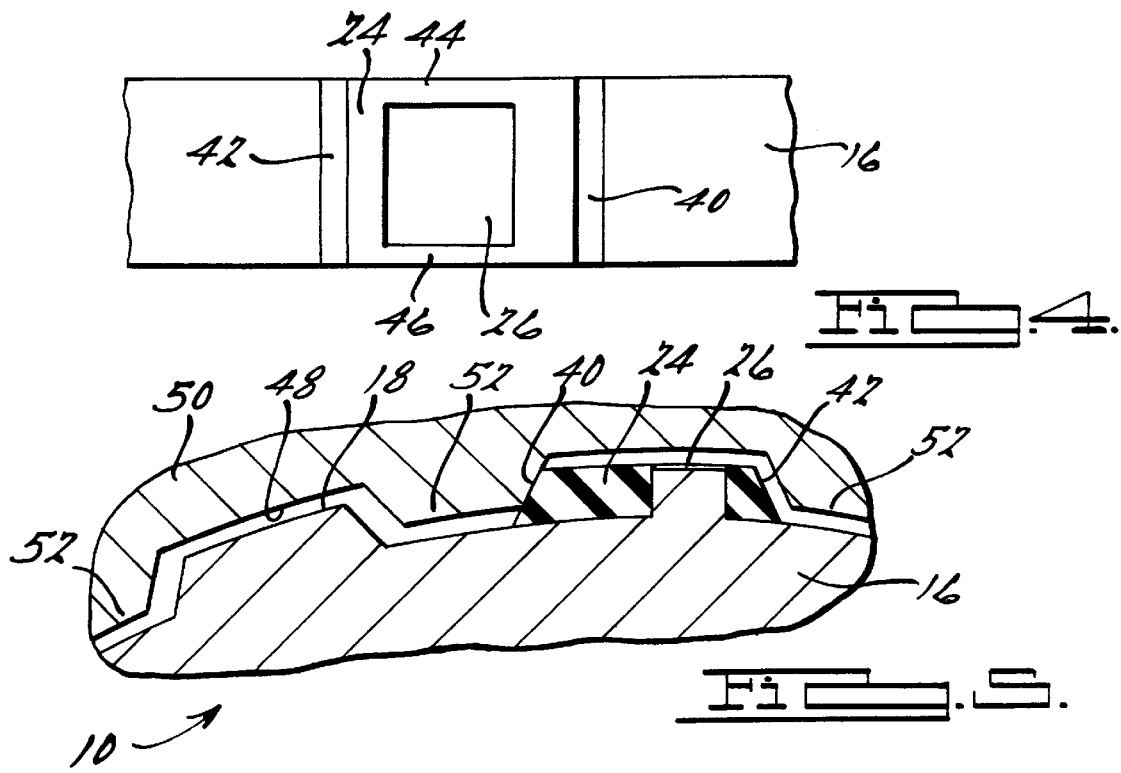
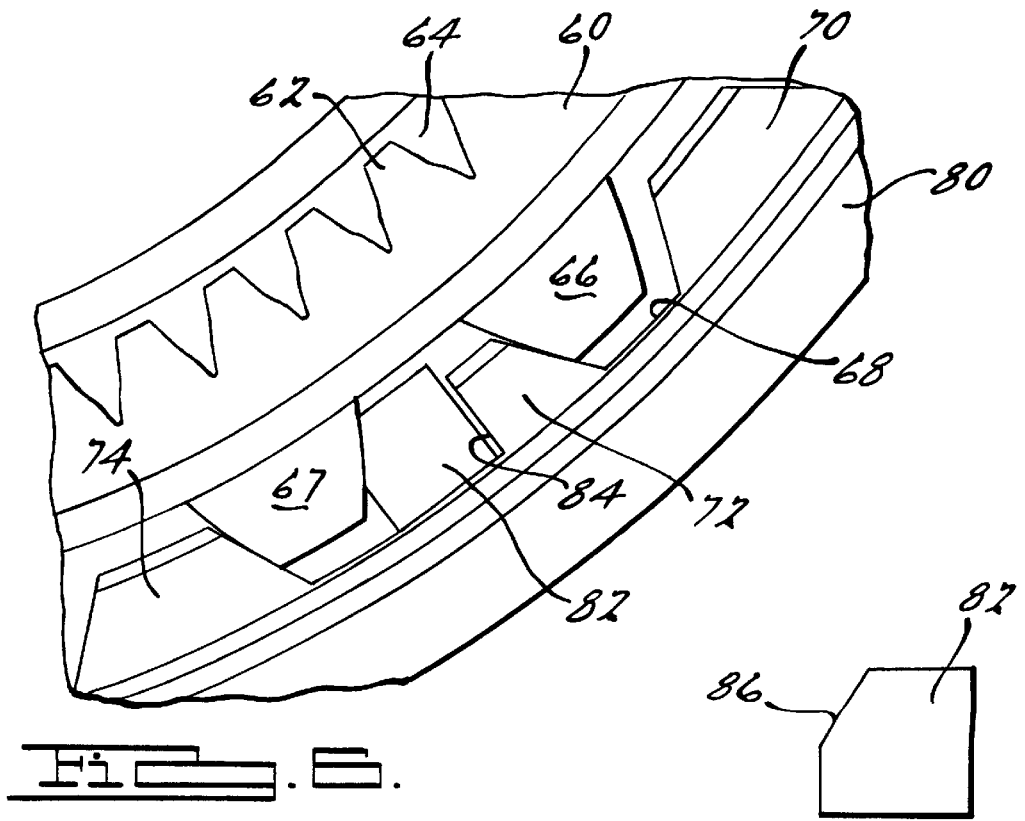

5,924,928

ENGAGEMENT NOISE ISOLATOR FOR AN AUTOMATIC TRANSMISSION

BACKGROUND OF THE INVENTION

1. Field of the Invention

This invention relates to the kinematic arrangement of an automatic transmission, more particularly to prevention of noise due to backlash of meshing gear teeth or spline teeth.

2. Description of the Prior

A one-way clutch or brake is often used in the kinematic arrangement of an automatic transmission to brake or hold a component of a gearset against rotation on a non-rotating component such as the transmission case. Conventionally a one-way brake includes a system of spline teeth engaged mutually with spline teeth formed on the case or housing. However, there is conventional gear tooth backlash resulting from this combination. For example, when the vehicle operator moves the shift lever to a forward drive position, torque is transmitted through the spline from the one-way brake to the transmission case. When this occurs, the spline teeth of the clutch move across a space between the teeth of the case and those of the clutch and strike the surfaces of the case spline teeth, resulting in noise that is sometimes heard by vehicle occupants.

Similarly, reverse engagement noise occurs in a final drive planetary gearset when spline teeth on the external surface of the ring gear strike spline teeth on the aluminum converter housing. The splines of the converter housing are cast in place and are in mutual engagement with steel splines formed on the final drive gear. The nature of this engagement can result in backlash between the two mating splines. When reverse engagement occurs as a result of the vehicle operator moving the shift selector to the reverse drive position, torque is transmitted through the final driving gear spline to the housing. When this occurs, noise may be heard in the passenger compartment of the vehicle due to the spline teeth striking one another.

SUMMARY OF THE INVENTION

To avoid these difficulties it is preferred to incorporate an isolator or damper in the assembly between the splines of the transmission case and those of the one-way brake or between the splines of a final drive ring gear and those of a converter housing. When an isolator according to the present invention is employed, backlash associated with forward drive engagement is absorbed by the damper or isolator, and the isolator is compressed at a desired rate until the metal splines are in mutual contact. Thereafter, all of the torsion transmitted between the engaged components is transferred through the splines, and the isolator is loaded no further.

In realizing these advantages and objects an assembly to which this invention is applicable includes a first component having first teeth spaced mutually apart by intervening first spaces; a second component having second teeth spaced mutually apart by intervening second spaces, each second tooth located in a first space, each first tooth located in a second space, each second tooth adapted for contact with successive first teeth and for separation from said first teeth, said mutual contact and separation resulting from movement of either the first component or second component relative to the other of said components, and posts, each post located in a first space; and an isolator surrounding a post and located in a first space, having a lateral wall, an outer lateral surface of the lateral wall extending toward an adjacent first tooth, the lateral surface adapted to contact said first tooth before a first tooth contacts a lateral surface of a second tooth corresponding to the lateral surface of the lateral wall that extends toward said adjacent first tooth.

BRIEF DESCRIPTION OF THE DRAWINGS

FIG. 1 is a front view of a one-way clutch assembly having noise isolators installed.

FIG. 2 is a cross section taken at plane 2—2 of FIG. 1.

FIG. 3 is an end view of a portion of a clutch assembly of FIG. 1 having a noise isolator.

FIG. 4 is a top view of the noise isolator taken in direction 4 of FIG. 3.

FIG. 5 is a cross section showing a clutch assembly, and isolator installed in a transmission casing.

FIG. 6 is an end view showing the drive connection of a final drive ring gear held against rotation on a torque converter housing, the assembly having a noise isolator installed.

FIG. 7 is an end view of the isolator shown in FIG. 6.

DESCRIPTION OF THE PREFERRED EMBODIMENT

FIGS. 1 and 2 show an overrunning clutch, sometimes referred to as a mechanical diode, of the type described in U.S. Pat. No. 5,070,978. The clutch is available commercially from Brenco Incorporated of Petersburg, Va. The clutch 10 is adapted to produce a one-way drive connection between an inner race 12, which is adapted to driveably engage spline teeth formed on a component of a transmission, the race having multiple angularly spaced spline teeth 14 integrally formed with the inner race. The outer race 16 also is adapted to driveably engage spline teeth formed on a component of the transmission, the outer race 16 having angularly spaced spline teeth 18 formed in its outer surface. Spline teeth 18 extend across the outer width of the race approximately 19 mm. A one-way drive connection between races 12,16 is completed by engagement of pivoted tab 19 in one of multiple, angularly spaced pockets 20 formed on the inner surface of the outer race that faces tab 18 and spring 22.

An isolator 24 is located at three mutually spaced angular locations about the central axis 25 of the clutch 10. At each of these locations, a post 26, formed integrally with the outer race 16, extends radially outward from the adjacent surfaces of the outer race. The front and rear surfaces 28, 30 of post 26 are offset from the corresponding front and rear surfaces 32, 34 of the outer race. Similarly the outer race is formed with a surface 36 that encircles post 26. In this way surfaces 28, 30, 36 define a recess surrounding post 26, within which is located isolator 24. The isolator extends a slight distance radially outward from the upper surface 38 of post 26.

The lateral walls of the isolator each have an inclined lateral surface 40, 42, each of which faces an adjacent tooth 18. However, the other lateral surfaces 44, 46 are not inclined, but have vertical surfaces, as FIG. 4 shows. Furthermore, the thickness of lateral wall 40 is greater than the thickness of wall 42. Both surfaces 40, 42 have a pressure angle of about 30 degrees, so that they are complementary to the 30 degree pressure angle of the adjacent teeth of the casing.

FIG. 5 shows clutch 10 having isolator 24 fitted over post 26 installed as it might be in an automatic transmission so that external teeth 18 of the clutch are fitted within intervening spaces 48 formed on a transmission case 50 between its internal spline teeth 52. FIG. 5 represents the condition where lateral surface 40 of the isolator is contacting the lateral face of tooth 52 without compressing the lateral wall of isolator 24. In this condition there is no driving contact between the lateral face of teeth 18 of the clutch and the lateral face of the adjacent tooth 52 on the casing. As clutch 10 rotates counterclockwise, relative to casing 50, the lateral surface 40 is loaded due to contact with tooth 52, and post 26 contacts the inner surface of the lateral wall that is in contact with tooth 52. This condition causes compression of the lateral wall of the isolator so that the three angularly spaced isolators, briefly during this initial period, carry the entire torsional load between the clutch and casing. When the lateral wall of isolator 24 is compressed due to this loading approximately 15% of its unloaded thickness, the lateral surfaces of teeth 18 contact the adjacent lateral surfaces of the internal teeth 52. Thereafter all the torsional load transmitted between the clutch and casing is transferred by contact between the engaged teeth, and there is no additional load applied to, or compression of the lateral wall of isolator 24.

Preferably the material of the isolator 24 is rubber having a Shore A durometer hardness in the range 70–90. The pressure angle of the lateral surfaces 40, 42 of the isolator is 30°; the pressure angle of the teeth is 30°. The major diameter of the external involute splines is 228.40–228.15; the minor diameter is 223.82; the number of teeth is 18 and the involute spline has a flat root. Three of the external involute spline teeth have been reformed as posts 26 from their original configuration as external spline teeth 18.

Preferably there is a slight interference fit between the external surfaces of the post and the internal surfaces of the isolator so that when the isolator is fitted over the post it is held there by friction resulting from the interference fit. In this way, the clutch is manufactured as a complete assembly by adding the isolator over the posts without further modification.

FIG. 6 is a view showing the ring gear 60 of a final drive planetary gear unit having internal gear teeth 62 meshing with external teeth 64 of a planet pinion. External spline teeth 66 are fitted within a space 68 between interviewing internal spline teeth 70, 72, 74 of a torque converter housing 80. The ring gear 60 may be formed of steel, and casing 80 of aluminum or magnesium.

A rubber isolator 82 is located in the space located between a lateral surface of a tooth 67 formed on ring gear 60 and a substantially radially directed surface 84 formed on tooth 72. The portion of tooth 72 that faces tooth 74 has been removed to provide space for isolator 82 in addition to the backlash space.

FIG. 7 shows the isolator cross section having a pressure angle of approximately 57.5°. The width of the isolator is approximately 14 mm. The isolator is preferably made of rubber having a durometer hardness 70–90.

In the condition represented in FIG. 6, the ring gear 60 is fixed against clockwise rotation about its central axis due to contact between teeth 66, 67 and teeth 72, 74, respectively. However, when the direction of torque applied to ring gear 60 changes, tending to cause the ring gear to rotate counterclockwise about its axis, teeth 66, 67 move away from contact with teeth 72, 74, and tooth 67 contacts the inclined surface 86 of isolator 82. This action forces the isolator into contact with surface 84, and compresses the isolator approximately 15% of its thickness until tooth 66 contacts tooth 70. Thereafter torque is transferred between ring gear 60 and housing 80 by mutual contact of teeth 66, 70 and other such pairs of teeth located about the axis. After tooth 66 contacts tooth 70, the isolator is not loaded further due to the torque transmitted between ring gear 60 and housing 80.

The arrangement illustrated in FIG. 6 preferably is repeated at the diametrically opposite side of the assembly so that two isolators are operable to absorb the backlash. Two reformed teeth of the type represented by 72, in which material is removed to produce a substantially radial surface 84, are included in the assembly. There are 24 teeth of the type represented by teeth 70, 74.

The form of the invention shown and described herein constitutes the preferred embodiment of the invention; it is not intended to illustrate all possible forms thereof. The words used are words of description rather than of limitation, and various changes may be made from that which is described here without departing from the spirit and scope of the invention.

We claim:

1. A device for preventing components from mutual contact comprising:

a first component having first teeth spaced mutually apart by intervening first spaces;

a second component having second teeth spaced mutually apart by intervening second spaces, each second tooth located in one of the first spaces, each first tooth located in one of the second spaces, each second tooth adapted for contact with one of the first teeth resulting from movement of one of the first component and second component relative to the other of said components, and a post located in a first space;

an isolator carried on the post, having a lateral wall facing one of the second teeth, an lateral surface of the lateral wall extending toward an adjacent lateral surface of one of the first teeth, the lateral surface of the isolator adapted to contact said adjacent lateral surface of said one first tooth, thereby resisting contact of the first and second teeth during a first amount of rotational movement and permitting said contact during a second amount of radial movement.

2. The device of claim 1, wherein the isolator is of rubber having a Shore A durometer hardness in the range 70–90.

3. The device of claim 1, wherein:

the post extends outward from a surface of the second component; and the isolator is carried on the post with an interference fit, whereby the isolator is retained on the post.

4. The device of claim 1, wherein:

the post extends outward from a surface of the second component; and the isolator surrounding and engaging the post, defining the lateral wall having the lateral surface extending away from the post and toward an adjacent first tooth, the lateral surface adapted to contact said first tooth.

5. The device of claim 1, wherein:

the post extends outward from a surface of the second component to a top surface; and the lateral wall of the isolator extends outward from said surface of the second component a greater distance than does the top surface.

6. A device for preventing components from mutual contact, comprising:

a first component having first teeth spaced mutually apart angularly about an axis by intervening first spaces;

a second component having second teeth spaced mutually apart angularly about said axis by intervening second spaces, each second tooth located in one of the first spaces, each first tooth located in one of the second space, each second tooth adapted for contact with one of the first teeth resulting from rotation of one of the first component and second component relative to the other of said components, and posts spaced mutually angularly about said axis, each post located in a first space;

isolators spaced mutually apart angularly about said axis, carried on a respective post, having a lateral wall facing one of the second teeth, a lateral surface on the lateral wall extending toward an adjacent lateral surface of one of the first teeth, the lateral surface of each isolator adapted to contact an adjacent lateral surface of said one first tooth, thereby resisting contact of the first and second teeth during a first amount of rotational movement and permitting said contact during a second amount of radial movement.

7. The device of claim 6, wherein the isolator is of rubber having a Shore A durometer hardness in the range 70–90.

8. The device of claim 6, wherein:

the post extends radially outward from a surface of the second component; and the isolators are carried on the posts with an interference fit, whereby the isolators are retained on the posts.

9. The device of claim 6, wherein:

each post extends radially outward from a surface of the second component; and each isolator surrounding and engaging a post, defining a lateral wall having the lateral surface extending angularly away from the post and toward an adjacent first tooth, the lateral surface adapted to contact said first tooth.

10. The device of claim 6, wherein:

the post extends radially outward from a surface of the second component to a radially outer lateral side of a radial line connecting a central axis and a radial plane through a tooth of either the first component or second component;

defining a surface of contact on the remaining portion of said partially removed tooth;

inserting an isolator made of rubber or other elastic material in the space formerly occupied by the removed portion of the tooth such that the isolator contacts a lateral face of an adjacent tooth of the component other than the component from which the tooth was removed.

* * * * *